Jan. 13, 1953  A. HOWARD ET AL  2,625,013
GAS TURBINE NOZZLE STRUCTURE
Filed Nov. 27, 1948  2 SHEETS—SHEET 1
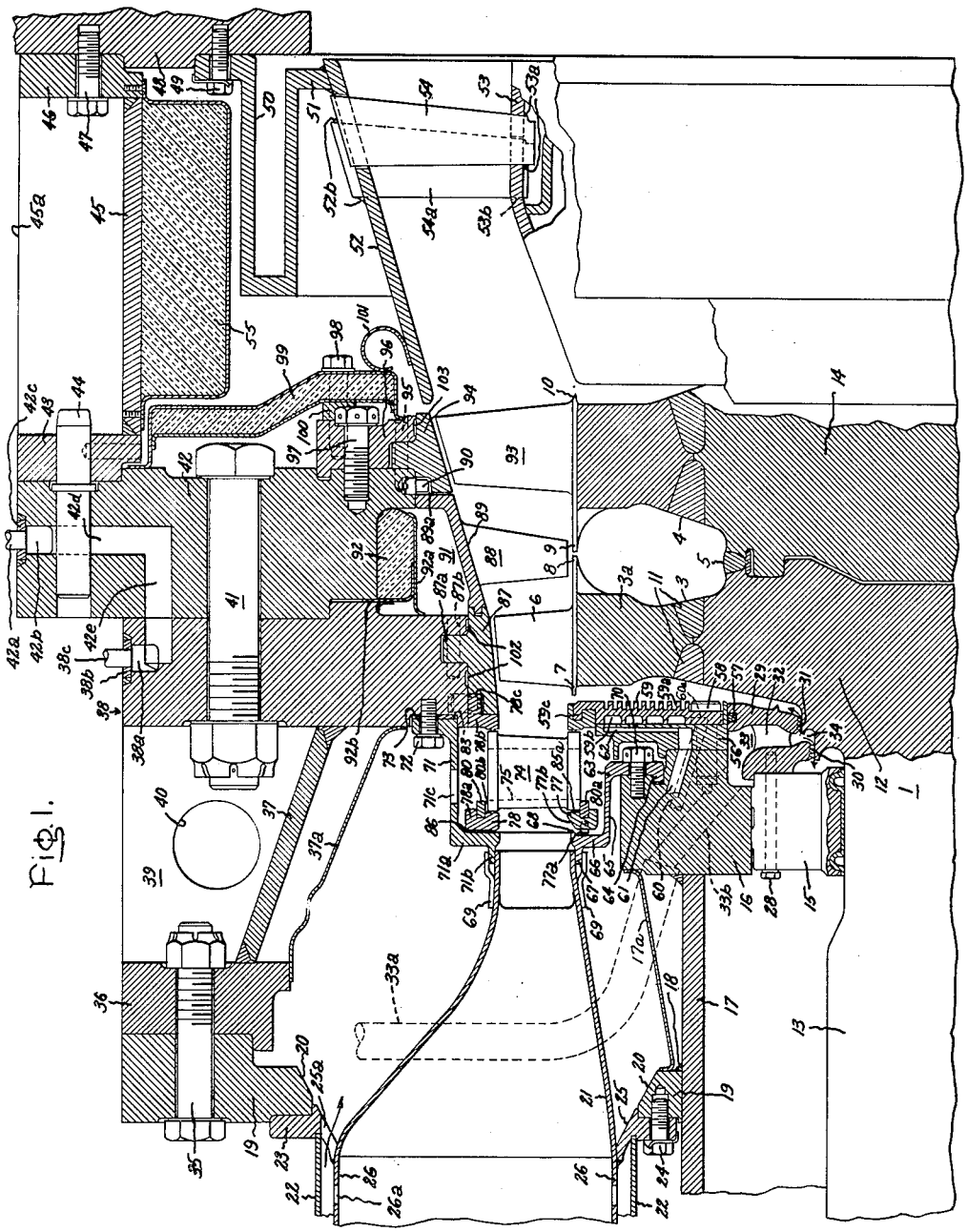
Inventors:
Alan Howard,
Chapman J. Walker,
by Francis S. Mack
Their Attorney.

Jan. 13, 1953
A. HOWARD ET AL
2,625,013
GAS TURBINE NOZZLE STRUCTURE
Filed Nov. 27, 1948
2 SHEETS—SHEET 2
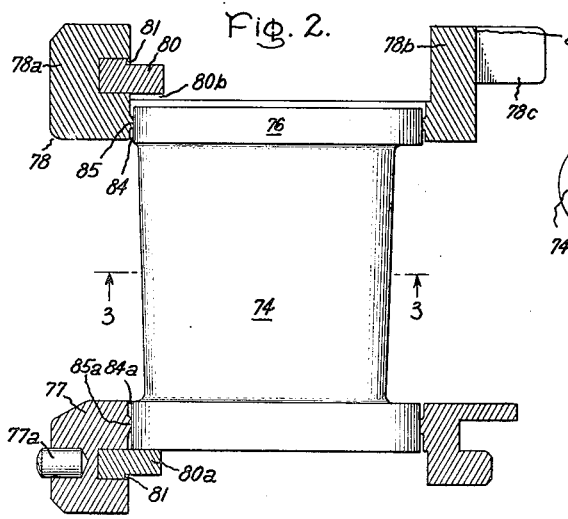
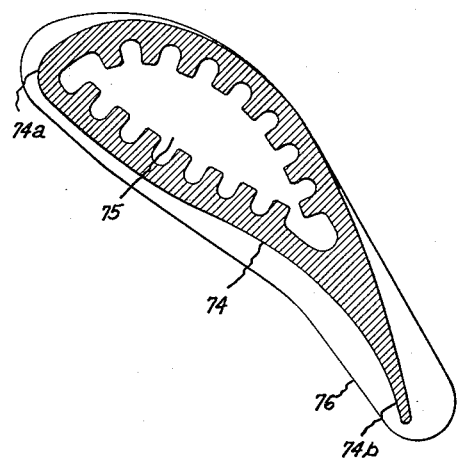
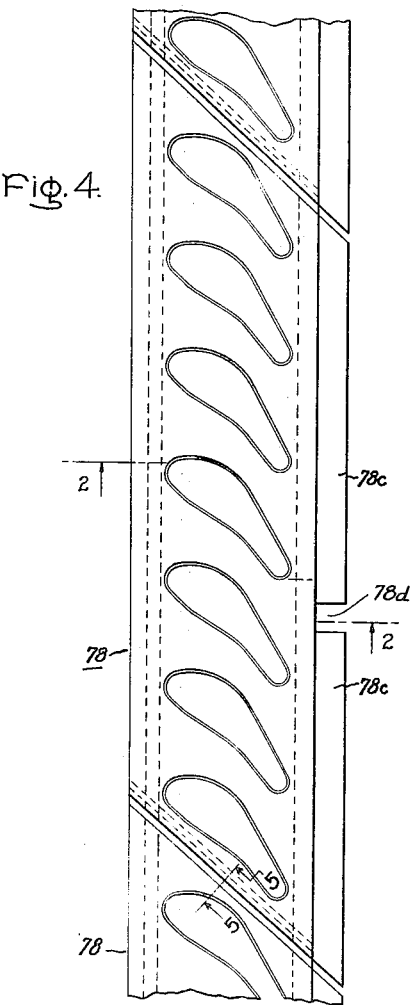
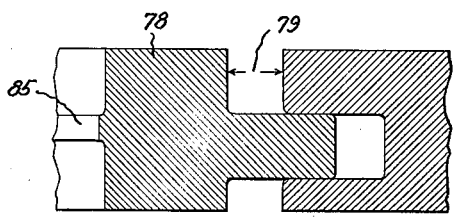
Inventors:
Alan Howard,
Chapman J. Walker,
by Prarell S. Mack
Their Attorney.

Patented Jan. 13, 1953

2,625,013

UNITED STATES PATENT OFFICE 2,625,013

GAS TURBINE NOZZLE STRUCTURE

Alan Howard and Chapman J. Walker, Schenectady, N. Y., assignors to General Electric Company, a corporation of New York Application November 27, 1948, Serial No. 62,372

7 Claims. (Cl. 60—39.32)

This invention relates to gas turbines, particularly the structure of the stationary nozzle ring for delivering hot motive fluid to the moving buckets.

Since the nozzle structure is ordinarily the part of a gas turbine power plant which experiences the highest temperatures, it will be appreciated that the mechanical design problems resulting from the extremely high differential thermal expansion between the parts of the nozzle proper and the comparatively cooler surrounding casing members are extremely difficult of solution. Not only are the airfoil blades forming the nozzle passages exposed to the highest temperatures occurring anywhere in the power plant, but they are also subjected to the greatest rate of change of temperature as operating conditions of the power plant vary. Because of the extremely high operating temperature level, and because of the thinness of the discharge edges of the nozzle blades, the mechanical design of the nozzle ring must be done with extreme care in order that the appreciable and rapid differential thermal expansion of the nozzle parts will not produce excessive stresses in the highly heated blades, which might otherwise cause them to fail and send broken fragments through the bucket wheels, with resulting damage or even complete destruction of the high speed rotor. It is of course also important that the critical nozzle structure be readily accessible for inspection and replacement of part or all the nozzle structure if it should be damaged or in need of cleaning or other servicing. To provide effectively for differential thermal expansion, and from the standpoint of ease of manufacture and replacement, it is advantageous to form the nozzle ring as a plurality of arcuate segments.

Accordingly, it is an object of the present invention to provide an improved mechanical structure of nozzle ring for a gas turbine power plant in which the nozzles are formed as a plurality of segments supported loosely in a casing structure in a manner to provide free differential thermal expansion therewith, while preventing the imposition of any extreme forces on the thin nozzle blades.

A further object is to provide an improved high temperature nozzle structure of the type described having a particularly advantageous arrangement for cooling the blades.

Other objects and advantages will be apparent from the following description taken in connection with the accompanying drawings in which Fig. 1 is a longitudinal view, in section, of the rotor, nozzle structure, and related casing structure of a gas turbine power plant incorporating the invention; Fig. 2 is an enlarged sectional view of the nozzle structure proper taken on the planes 2—2 in Fig. 4; Fig. 3 is a sectional view of a single nozzle blade showing the internal cooling passage, taken on the plane 3—3 in Fig. 2; Fig. 4 is a developed view of the outer circumference of a single nozzle segment; and Fig. 5 is a sectional view of a detail of the nozzle segment taken on the plane 5—5 in Fig. 4.

Referring now to Fig. 1, the turbine rotor is shown generally at 1 as consisting of a two-stage bucket-wheel having discs 3, 4 secured together by a special weld indicated generally at 5, this weld being disclosed more particularly in the copending application of Alan Howard filed November 27, 1948, Serial No. 62,373 and assigned to the same assignee as the present application. The bucket-wheels are actually of a composite construction as described in the United States Patent to Alan Howard, 2,432,315 issued December 9, 1947, and assigned to the same assignee as the present application. This composite construction includes a rim portion 3a made of an austenitic material having high temperature resistance and good strength at elevated temperatures, carrying a circumferential row of buckets 6 which are of the open-ended or "shroudless" type and may be secured to the rim portion 3a by a suitable dovetail construction or other appropriate fastening devices, the details of which are not material to an understanding of the present invention. The base portions of the buckets are provided with axially and circumferentially extending portions 7, 8, 9 and 10 which cooperate to form the radially inner wall of the flow path through the rotor and form close clearances with adjacent parts to prevent undesired flow of hot motive fluid into the clearance spaces surrounding and within the rotor. The high-temperature austenitic rim 3a is secured by the annular weld 11 to a central web portion 12, which may be made of ordinary low-carbon steel and is secured to or formed integral with the shaft 13. The construction of the second stage bucket-wheel 14 is similar to that of the first stage wheel, as will be readily seen in Fig. 1.

Shaft 13 is supported in a plurality of suitable bearings, only one of which is shown at 15 as a plain journal bearing supported in a main frame or inner stator ring member 16. This bearing is of course provided with suitable grooves and other passages for supplying oil to the bearing surfaces, but these are conventional elements believed unnecessary to an understanding of the present invention.

The massive main frame ring 16 is welded to a cylindrical frame member 17, which is coaxial with the shaft 13 and is in turn welded at 18 to a transverse radially extending annular plate member 19 provided with a plurality of circumferentially spaced openings 20 through which project the transition pieces or "fish-tails" 21 conducting the gas from the cylindrical combustor liner 26 to the annular nozzle ring. Only a portion of one combustor is shown, including a cylindrical outer housing 22 fitting a rabbet formed in an attachment plate member 23 held by suitable threaded fastenings 24 to the annular plate 19. Attachment plate 23 is provided with an inwardly extending annular portion 25 to which is secured the discharge end of the inner liner 26 and the cooperating entrance end of the transition piece 21. These support portions 25 are provided with a plurality of openings as shown at 25a so that a desired quantity of cooling air from the plenum chamber formed between outer housing 22 and liner 26 may flow in the manner indicated by arrow 27 into the space surrounding the transition piece 21, for purposes noted hereinafter.

Secured to journal bearing 15, as for instance by a plurality of suitable threaded fastenings 28, is a sealing member 29 defining a pair of axially spaced labyrinth seals 30, 31 cooperating with circumferential shoulders formed on the hub of wheel disk 12. The cast seal member 29 is provided with a plurality of radially extending passages 32 connecting the annular chamber 33 with an inner annular recess 34 formed between the labyrinth seals 30, 31.

High pressure air from a suitable source, for instance a compressor supplying air to the combustors, is supplied to the annular chamber 33 by means of a pipe 33a which extends between adjacent transition pieces 21 and communicates with a drilled hole 33b in the frame ring 16. It will be understood by those skilled in the art that pressurized air from the annular chamber 33 flows through the radial passages 32 to the recess 34 where it divides, part of it flowing to the left through the labyrinth seal 30 so as to resist the leakage of oil in the opposite direction through seal 30, while the remainder of the air flows to the right through labyrinth seal 31 so as to resist the entrance of hot motive fluid into the annular space between the first bucket-wheel and the adjacent casing parts. The outer circumference of the seal casting 29 is sealed to the adjacent inner circumference of an annular plate member 56, the clearance space therebetween being closed by a resilient sealing ring 57 disposed in an annular groove in the outer circumference of member 29. Member 56 is secured by threaded fastenings 58 to the main frame ring 16. Secured to annular plate 56 is a "cooling pad" member 59 having concentric grooves 59a at one side to form an extended radiating surface facing the hot wheel rim, and having at the other side larger concentric grooves 59b constituting passages for the flow of cooling water. This cooling water may be supplied by means of suitable conduits communicating with drilled holes indicated by the dotted lines at 60 and the solid lines at 61 in Fig. 1. Specifically, cooling liquid may be supplied through passage 60 to a radially extending groove 60a in the cooling pad member 59, thence into the innermost one of the concentric cooling water passages 59b. It will of course be appreciated that suitable radial passages (not shown) communicate between the respective grooves 59b so that the cooling water will flow successively through the other passages 59b until it reaches the outermost one, whence it enters a discharge passage 62 formed in the support plate 56. From passage 62, the spent cooling liquid is discharged through the drilled hole 61.

The heavy annular plate 19 is secured by bolts 35 to a continuous ring member 36 which is in turn welded to an annular plate 37 of roughly conical configuration. To plate 37 is in turn welded another heavy main frame ring or stator member indicated generally at 38. A plurality of circumferentially spaced radially extending plates 39 brace the rings 36, 38 and plate 37 to form an extremely rigid integral unit. Plates 39 may have holes 40 to reduce weight somewhat and also provide "lifting eyes" for handling the casing.

The heavy main frame ring 38 is secured by bolts 41 to another frame ring 42. Secured to the opposite face of ring 42 is a ring member 43, held by bolts which are not shown but alternate circumferentially with dowel pins 44 pressed into holes in the ring 42 to insure proper alignment of rings 42, 43 and facilitate disassembly thereof.

It will be apparent from Fig. 1 that rings 36, 37, 38, 42 constitute the turbine casing proper, while ring 43 is the beginning of the exhaust casing structure. Welded to the inner circumference of ring 43 is an axially extending cylindrical member 45 which at its other end is welded to another frame ring 46. A plurality of longitudinally extending circumferentially spaced ribs 45a are welded to the outer circumference of cylinder 45 and to the respective rings 43, 46, so that these members form a rigid integral unit. Ring 46 is secured by bolts 47 to still another continuous frame ring member 48. To ring 48 is secured by bolts 49 a convoluted annular member 50 having an inner circumferential portion 51 welded to an annular wall 52 forming the outer wall of the discharge passage from the second stage wheel 14. The inner wall of this discharge passage is formed by a member 53 supported from outer wall 52 by means of the radially extending struts or guide vanes 54. To this end, the streamline struts or airfoil blades 54 are welded to either of the annular wall members, but not to both. More specifically, the strut or vane 54, which is in the plane of the drawing in Fig. 1, is welded to the inner wall 53 as shown at 53a. At the opposite end, vane 54 extends freely through an opening in wall 52. The next adjacent blade, shown at 54a, which is of course behind the plane of the drawing in Fig. 1, is welded to the outer wall 52 as shown at 52b and projects freely through the inner wall 53 as indicated by the dotted lines at 53b. With this arrangement, free differential thermal expansion is permitted between the inner wall member 53 and the outer member 52 without imposing excessive longitudinal forces on the airfoil blades 54. These blades may of course be shaped to straighten out the flow of hot gas from the first rotor in order to minimize the losses in the exhaust passage, or they may be arranged to define nozzle passages for directing the motive fluid into additional bucket-wheels (not shown).

The parts forming the hot motive fluid flow path will now be described in more detail. The first stage nozzle structure comprises a rather intricate composite assembly supported between the main frame ring 16 and the outer main frame ring 38. Beginning at the radially inner portion of the nozzle ring assembly, a support ring member 63 has a radially inner portion forming an annular rabbet fit at 64 with frame ring 16. The outer portion of member 63 defines an axially extending cylindrical portion or inner nozzle casing ring 65 surrounding and spaced from the frame ring 16, a radially extending portion 66 having at its circumference a first axially extending circumferential flange 67 and a smaller circumferential projection extending in the opposite direction as shown at 68. The flange 67 receives the annular discharge portion of the transition piece 21, this engagement being facilitated by a plurality of small spring clips 69 which may be spot-welded or otherwise suitably secured to the adjacent surface of transition piece 21. As will be apparent in Fig. 1, the nozzle support ring 63 is secured to the main frame ring 16 by a plurality of suitable threaded fastenings 70. The outer circumference of the cooling pad 59 also helps to support the nozzle structure, by means of the circumferential portion 59c as more particularly described hereinafter.

The supporting means for the outer portions of the nozzle ring structure comprise an annular nozzle casing member 71 having a radially extending flange secured by bolts 72 to the inner circumferential portion of the main frame ring 38 with a shim 73 between. This shim is of a definite preselected thickness for a purpose noted hereinafter. At the side remote from the bolted flange, the ring member 71 is provided with an inwardly extending flange 71a having an axially extending flange 71b which supports the discharge end of transition piece 21 in a manner analogous to that described in connection with the flange 67 of the inner nozzle support ring 63, the similarity being readily apparent from the drawing.

The nozzle ring proper is made up of a plurality of hollow cast nozzle blades 74, each having a longitudinal cooling air passage extending entirely therethrough, as indicated by dotted lines at 75. The cross section of a nozzle blade shown in Fig. 3 indicates more clearly the cooling passage. Because of its complex shape, this nozzle blade is preferably precision cast of a high temperature resisting material, such as a suitable austenitic alloy steel, each blade being cast separately. As will also be seen in Fig. 3, the blade has a rather blunt rounded inlet portion 74a and an extremely thin tapering discharge portion 74b. To facilitate supporting the blade in the inner and outer rings described hereinafter, each has cast integral therewith a transversely extending flange 76. This flange is roughly the shape of the blade, but is much thicker at the trailing edge of the blade, thus making it unnecessary to form grooves the actual width of the discharge edge of the blade in the nozzle support rings.

These separately cast nozzle blades are supported in a pair of concentric ring members 77, 78. These are shown in section in Figs. 1 and 2, and a developed plan view of one of them is shown in Fig. 4. As indicated in Fig. 4, these members 77, 78 are not continuous annular rings, but are made in arcuate segments, each segment supporting seven nozzle blades, there being forty-two blades in all to comprise the complete nozzle ring. As will also be understood from Fig. 4 taken in conjunction with the enlarged section in Fig. 5, these segments are connected at their adjacent ends by means of a tongue and groove connection having sufficient clearance at 79 that thermal expansion of the segments in a circumferential direction is permitted without any change in the mean inner diameter of the nozzle ring. From a thermodynamic and aerodynamic standpoint it is of course important that the diameter of the nozzle ring relative to the moving buckets should not change appreciably as the operating temperature changes.

As may be seen in Fig. 1, and to an enlarged scale in Fig. 2, the nozzle blade support ring 78 is of channel shaped cross section, the left-hand leg 78a of the channel being provided on its inner surface with a circumferential groove in which is seated a segmental locking ring 80. This ring may be conveniently held in place by calking or peening at 81. The other leg of the channel 78b has an axially extending flange 78c. In each segment 78, the arcuate flange 78c is provided with an axially extending slot 78d, the bottom of which is indicated at 82 in Fig. 2. This slot is open at the right-hand side of flange 78c, so that in assembling the nozzle support ring the segments 78 may be moved in an axial direction into position relative to the main frame ring 38, with the slot sliding over the projecting end of a key member in the form of a radially disposed dowel pin shown in dotted lines at 83 in Fig. 1. This pin 83 provides a fixed point for locating the nozzle segment in a circumferential direction so that the segment will expand circumferentially in either direction from this datum point.

It will be noted that there is a certain clearance space allowed at 80b between the inner circumferential surface of the locking ring 80 and the adjacent ends of the nozzle blade castings. A certain degree of looseness is desired here in order that under no operating conditions will differential thermal expansion produce excessive stresses in any of the parts constituting the nozzle ring assembly. With the present arrangement, the nozzle blade castings can expand and contract in a longitudinal direction without completely closing up the clearance space 80b. It will also be noted that there is a clearance space at 84 (Fig. 2) between the end flange 76 and the adjacent surface of the slot formed in the support ring 78. In order to prevent leakage of hot motive fluid through this clearance space 84, a small projecting ridge or "bead member" shown at 85, which of course extends entirely around the end flange 76, is provided on the ring 78. Projection 85 is of sufficient size that it will ordinarily support the nozzle blade in proper spaced relation relative to the ring 78, but at the same time it is small enough that, in the event of excessive forces being imposed between the end flange 76 and the ring 78, due to differential thermal expansion therebetween, the small projecting "bead" or ridge 85 will be crushed somewhat before any excessive bursting forces are imposed on the ring 78. It will ordinarily happen that the first time the machine is operated, the flanged end 76 will expand and crush the bead member 85 to a certain degree so that the bead exactly fits the blade when in its hot condition. Due to the permanent set thus given to the bead 85, there will be some slight clearance between it and the flanged end 76 when in the cold condition, but each time the machine is operated this clearance space will completely close up.

The purpose of the carefully selected shim 73 between the flanged end of the outer nozzle support ring 71 and the main frame ring 38 may now be seen. As indicated at 66 in Fig. 1, a slight clearance space is left between the edge of ring 78a and the adjacent surface of member 71a. The parts are designed so that this clearance space is large enough that it will not entirely close during any operating conditions, in order to prevent excessive stresses being imposed on the ring 71. At the same time, too much looseness of the nozzle support segment 78 is to be avoided. Taking into consideration these factors, the shim 73 is so selected that the clearance space 86 will be of a size to permit free differential thermal expansion between rings 71, 78 under all operating conditions to be anticipated, while not giving excessive looseness.

The arrangement of the inner nozzle blade support ring 77 is quite analogous to that described in connection with the outer ring 78. The locking segment 80a, clearance space 84a, circumferential projection 85a are all analogous to the correspondingly numbered elements in the outer ring structure. Here however the right-hand edge of the ring 77 forms a tongue and groove connection with the circumferential flange 59c of the cooling pad 59. A dowel pin, analogous to the pin 83 described above in connection with the outer segment 78, may be provided to locate segment 77 circumferentially relative to the support flange 59c. At the left-hand side of the ring 77, one or more small dowel pins 77a are pressed into holes drilled in the ring 77, the protruding end of the dowel being adapted to loosely engage the adjacent surface of the support ring 66. By this positive spacing means, a cooling air flow passage is provided between the rings 77, 66, as described more particularly hereinafter.

Thus it will be seen that this composite nozzle ring structure is so designed that free differential thermal expansion is provided for the blade castings 74, by reason of the clearance spaces 80b, 84, 84a, also for the outer support ring segment 78 in a circumferential direction by reason of the clearance spaces 79 (Fig. 5) and in an axial direction by reason of the clearance space 86. The parts are so designed that these clearance spaces will almost completely close up at the maximum operating temperatures to be encountered, so that no substantial leakage paths for the motive fluid are provided in normal operation. Any leakage which occurs when the machine is cold and the clearances are at a maximum, will only serve to help bring all parts up to operating temperature rapidly and uniformly.

The novel cooling arrangement for the nozzle structure will now be outlined. It will be appreciated by those skilled in the art that the combustor is of a type in which air at a suitable pressure from a compressor (not shown) is delivered to the plenum chamber defined between the outer combustor housing 22 and the liner 26. From this air supply space, combustion air passes through suitably arranged openings 26a in the liner, which may be arranged in accordance with the copending application, now Patent No. 2,601,000 of Anthony J. Nerad, Serial No. 750,015, filed May 23, 1947, and assigned to the same assignee as the present application. Some of the comparatively cool air under pressure in the plenum chamber flows through the circumferentially spaced openings 25a in the combustor support ring 25, which openings are of a size carefully selected to pass just the amount of air needed for effective cooling of the nozzle structure. It will be apparent that this air circulates around the outer surfaces of the transition piece 21 for cooling that part also. In order to confine the flow of this cooling air, and to serve as radiation shields between the hot transition piece and nozzle structure and the comparatively cooler main frame structure, a sheet metal shield member 17a may be secured as by welding to the frame rings 19, 16, and a similar shield 37a is secured to the outer frame rings 36, 38, in a manner which will be apparent from Fig. 1. These shield members define a chamber from which cooling air is supplied through a plurality of circumferentially spaced perforations 71c in the axially extending portion of the nozzle support ring 71. It will be obvious that the nozzle support ring 71 and the outer blade support ring 78 define an annular cooling air manifold entirely surrounding the nozzle blade assembly so that cooling air is distributed uniformly to all the longitudinal passages 75 through the respective blades. Likewise the inner nozzle blade support ring 77 and the ring 65 define a manifold for collecting the spent cooling fluid. The space provided between ring 77 and support ring 66 by the dowel pins 77a constitutes a discharge passage for the spent coolant. The cooling air flows along the tapered surface 77b of ring 77, which is so inclined that the direction of the cooling air flow is in the same general direction as that of the motive fluid flowing through the hot gas passages. Thus the coolant fluid is mixed with the hot gas with a minimum of disturbance to the flow of the latter. Furthermore, the cooler air tends to flow along the radially inner wall of the hot gas passage. Thus a cooler film of fluid is provided immediately adjacent the end flanges 76 and this cool blanket of fluid persists into the moving buckets 6, so that the highly stressed root portions of the buckets are subjected to a lower temperature than the mean temperature of the motive fluid. As will also be seen in Fig. 1, the small axial projection 68 of ring 66 cooperates with the adjacent inclined surface 77b of ring 77 to define an annular nozzle for discharging the cooling air in the desired direction and with the desired velocity.

With the above described cooling air arrangement, it will be apparent that the static pressure of the cooling air in the space within the shield 37a will be substantially the same as the pressure in the plenum air space between combustor housing 22 and liner 26. The flow of cooling air described above is effected by reason of the fact that the transition pieces 21 are so shaped that the velocity of the hot gas issuing from the combustor increases appreciably as it approaches the nozzle ring. This means that an appreciable portion of the static pressure energy of the hot motive fluid is converted into velocity energy at the entrance to the nozzle ring. Thus the static pressure existing at the entrance to the nozzle ring will be appreciably below the static pressure of the cooling air outside the transition piece. It is this difference in static pressure which causes the cooling air flow in the manner described above. Another way to look at this is that the high velocity of the motive fluid produces an "aspirating effect," which sucks the cooling air through the passages as described above.

Having described the nozzle structure proper, brief reference will now be made to the parts forming the remainder of the hot gas passage in the stationary casing. A stationary shroud ring for the open-ended first stage bucket 6 is formed by a ring of segments 87, there being one segment corresponding to each of the nozzle ring segments 78. Segments 87 are also arranged for free thermal expansion in a circumferential direction, either by reason of tongue and groove connections similar to that shown in Fig. 5 in connection with the nozzle ring 78, or simple clearance spaces, without the tongue and groove arrangement, as disclosed in the copending application of Alan Howard, Serial No. 107,306, filed July 28, 1949, and assigned to the same assignee as the present application. Each segment 87 has a radial projection 87a forming a tongue and groove connection with the main frame ring 38, in a manner which will be apparent from Fig. 1. Each segment is secured in the frame ring by means of an axial dowel pin shown in dotted lines at 87b. It will be apparent that the single dowel pin 87b associated with each shroud segment 87 performs the same locating function as the radial dowel pins 83 do for the nozzle ring 78.

In connection with the stationary shroud structure, it may be noted that the main frame rings 38, 42 are arranged to be cooled by water circulated from an inlet pipe 42a, to a circumferential channel 42b formed as a groove in the ring 42 closed by a circumferential band 42c, which may be suitably welded in place. From chamber 42b, this cooling water flows through radial passages 42d circumferentially spaced around the ring 42, thence through communicating axial passages 42e and into corresponding passages in the ring 38. Spent cooling water is collected in an annular chamber 38a formed as a circumferential groove in the outer surface of ring 38 and covered by a plate 38b having a discharge opening for the cooling water leaving through conduit 38c. With this cooling arrangement the heavy main frame rings 38, 42 are caused to maintain quite accurately their original "cold" dimensions.

Thus there is provided for the shroud segments 87 a support which experiences substantially no change in its radial dimensions when going from cold to operating temperature conditions. Therefore, by reason of the differential thermal expansion permitted in a circumferential direction by the clearances between the ends of the arcuate segments 87, the diameter of the inner circumferential surface of the stationary shroud remains substantially constant, thus making easier the problem of maintaining a desired bucket-to-shroud clearance space under all operating conditions. This is of course important from the standpoint of aerodynamic efficiency of the turbine.

Supported between the first and second stage bucket-wheels is an annular row of interstage blades 88, there being in the present case fifty-four of these blades. These are supported on a blade carrier member 89 which is likewise formed in separate arcuate segments, each forming a tongue and groove at the left-hand side with the stationary shroud segments 87, and supported at the right-hand side by means of a slotted flange 89a engaging a dowel pin 90 in the manner described in connection with the dowel pin 83 and slotted flange 78c of the nozzle support ring 78. As will be seen in Fig. 1, the blade carrier segments 89 cooperate with the main frame ring 42 to define an annular chamber 91 in which is located an annular pad 92 of insulating material, such as an asbestos or magnesia composition, for reducing the flow of heat from the hot wall 89 to the cooler support ring 42. This heat insulating pad may conveniently be enclosed by sheet metal cover structure 92a having a radially extending portion 92b which is clamped between the main frame rings 38, 42 when in assembled relation.

The second-stage buckets 93 are surrounded by stationary shroud segments 94 which are similar in construction and arrangement to the stationary shroud 87 of the first stage buckets. Blocks 94 are pinned in place by dowel pins 95 relative to a casing ring 96 which is secured by bolts 97 to the main frame ring 42. Secured to ring 96 by bolts 98 is another annular radially extending heat insulation pad 99, there being suitable spacers 100 interposed between pad 99 and the support ring 96.

The remainder of the hot-gas passage is formed by the wall 52 and the inner wall 53 described above. Secured to the outer surface of wall 52 is a sheet metal ring of C-shaped cross section 101. As will be seen in Fig. 1, this is suitably welded at one end to the wall 52 and bears resiliently against the outer surface of the heat insulation pad 99. It will be apparent that the pressure of any hot motive fluid leaking into the space between wall 52 and the inner circumferential portion of pad 99 will enter the C-shaped ring and this pressure will increase the force of the ring 101 against the surface of pad 99 so as to improve the sealing effect therebetween.

As may be seen in Fig. 1, the surface of ring 38 is cut away at 102 to provide a minimum metal-to-metal contact with the hot shroud block 87. Ring 96 is likewise relieved at 103, to reduce transfer of heat.

Thus it will be apparent that, by means of heat insulating pads, suitable air spaces, and the use of minimum metal-to-metal contact between the hot metal walls and the cooler frame structure, the flow of heat from the hot motive fluid into the main supporting members is kept to a minimum. Furthermore, each of the hot wall members is carefully designed so that it can have free differential expansion relative to the cooler support members which carry it without imposing excessive forces on the support members or on the hot walls. These design features, taken in connection with the water cooling of the main frame rings and the novel air cooling arrangement for the first-stage nozzle blades provide a very effective arrangement in which the hot wall members are accurately maintained in proper position relative to the rotor yet are permitted to expand and contract freely as temperature changes, while the main frame structure remains comparatively cool so as to maintain its dimensional accuracy.

It will be apparent to those skilled in the art that a great many changes and modifications may be made in high temperature turbine casing structure incorporating the invention, and we desire to cover by the appended claims all such changes and modifications as fall within the true spirit and scope of the invention.

What we claim as new and desire to secure by Letters Patent of the United States is:

1. In a nozzle ring assembly for a high-temperature turbo-machine, the combination of concentric radially spaced blade support rings having circumferentially spaced openings, a plurality of circumferentially spaced nozzle blades each having root and tip portions at least one of which is loosely disposed in one of said openings, the openings being substantially the shape of the respective root and tip portions of the blades but slightly larger so as to define a small clearance space therewith, a narrow bead member extending from a support ring or from a blade and being arranged circumferentially around a blade and substantially closing said clearance space to prevent leakage of fluid therethrough, the size of the bead member being sufficiently small that thermal expansion can result in some crushing of the bead without imposing excessive stresses on the blades or rings.

2. A nozzle segment for a high-temperature turbo-machine comprising concentric radially spaced arcuate blade support members having circumferentially spaced openings, a plurality of nozzle blades each having root and tip portions at least one of which is loosely disposed in one of said openings, the openings being substantially the shape of the respective blade root and tip portions and slightly larger so as to define a small clearance space therewith, a narrow bead member extending from a blade support member or from a blade and being arranged circumferentially around a blade and occupying said clearance space to prevent leakage of fluid therethrough, the size of the bead member being such that thermal expansion can result in some crushing of the bead member without imposing excessive stresses on the blades or support members, means associated with said blade support members for preventing the blades moving more than a predetermined distance in a radial direction relative to the blade support members, one of said blade support members having a portion adapted to be supported on radially extending key means in the turbine stator casing.

3. In a high-temperature turbo-machine blade support structure the combination of a stator ring, cooling means for abstracting heat from the ring to maintain the dimensional accuracy thereof, means associated with said stator ring and defining a radial key, at least one arcuate blade support segment of an extent in a circumferential direction substantially less than 180° and carrying a plurality of circumferentially spaced blades, the end portions of the segment defining clearance spaces in a circumferential direction with adjacent parts of the assembly, said segment having a portion defining a single radially extending slot adapted to engage said key means, and means associated with the stator ring for limiting radial shifting of the segment on the key, whereby the bladed segment is permitted a limited degree of freedom in both a circumferential and a radial direction relative to the cooled stator ring.

4. In a high-temperature turbo-machine the combination of a stator ring, means for cooling the ring to maintain the dimensional accuracy thereof, a high-temperature nozzle structure comprising concentric radially spaced arcuate blade support members having a plurality of circumferentially spaced openings, a plurality of nozzle blades each having root and tip portions at least one of which is loosely disposed in one of said openings, each opening being substantially the shape of the respective root and tip parts and slightly larger so as to define a small clearance space therewith, a narrow projecting bead member extending circumferentially around the blade and occupying said clearance to substantially prevent leakage of fluid therethrough, the size of the bead member being such that thermal expansion can result in some crushing of the bead member without imposing excessive stresses on the parts, means associated with the blade support members for preventing the loose blades moving more than a predetermined distance in a radial direction relative to the support members, means supporting the outer blade support segment on the stator ring including a single radial key means secured to the stator ring and engaging a radially extending recess in a portion of said outer blade support segment, an arcuate nozzle casing member surrounding the outer segment and having at one end a radially outwardly extending flange bolted to the stator ring, a shim of a preselected thickness located between said bolting flange and stator ring, the other end of said nozzle casing ring having a radially inwardly extending flange forming a preselected clearance space with an adjacent radial surface of the outer segment, the thickness of said shim being such that said axial clearance space is sufficient to permit free axial thermal expansion of the outer nozzle support segment.

5. In a turbo-machine having a frame including concentric radially spaced stator rings and a combustor having a transition piece with a discharge portion terminating substantially at the plane of the stator rings, the combination of a high temperature nozzle structure comprising concentric radially spaced arcuate blade support segments each having a plurality of circumferentially spaced openings, a plurality of nozzle blades each having root and tip portions loosely disposed in said openings, locking ring segments connected to each of the support segments and adapted to engage the respective ends of the nozzle blades to prevent movement thereof in a radial direction more than a preselected amount, the clearance between the locking rings and the ends of the blades being just sufficient to permit free differential thermal expansion between blades and rings, means supporting the outer blade support segments from the outer stator ring including radial key means secured to the stator ring and engaging a single radially extending recess in a portion of each outer blade support segment, an annular outer nozzle casing member surrounding the outer blade support segments, said casing member having at one end a radially outwardly extending flange adapted to be releasably secured to the outer stator ring, a shim of a preselected thickness located between said flange and stator ring, the other end of the outer nozzle casing ring having a radially inwardly extending flange forming a preselected axial clearance space with an adjacent surface of the outer segments, said last mentioned flange having a portion adapted to engage the discharge portion of the combustor transition piece, the thickness of said shim being such that said axial clearance space is just sufficient to permit free axial thermal expansion of the outer nozzle support segments, and means supporting the inner blade support segments including a circumferentially extending flange at one side of the inner blade support segments defining a circumferential rabbet adapted to engage the inner stator ring, and a second radially inner nozzle casing ring secured to the inner stator ring and having an axially extending portion radially spaced from the inner blade support segments, the inner nozzle casing ring having also a radially extending flange adapted to engage the radially inner portion of the combustor transition piece.

6. In a nozzle assembly for a high-temperature turbo-machine, the combination of radially spaced arcuate blade support members at least one of which has circumferentially spaced openings, a plurality of circumferentially spaced nozzle blades, each having an end portion loosely disposed in the respective openings, said openings being substantially the shape of the respective end portions of the blades but slightly larger so as to define a small clearance space therewith, one of the cooperating clearance-defining parts having a narrow projecting protuberance occupying the clearance space between blade and support member for substantially closing the clearance space to prevent leakage of fluid therethrough, the size of the protuberance relative to adjacent portions of the blade and support member being sufficiently small that relative thermal expansion therebetween may effect some crushing of the protuberance without imposing excessive stresses on the blades or supports.

7. A nozzle segment for a high-temperature turbo-machine comprising concentric radially spaced arcuate blade support members at least one of which has circumferentially spaced openings, a plurality of nozzle blades each having an end portion loosely disposed in one of said openings, the openings being substantially the shape of the respective blade parts and slightly larger so as to define a small clearance space therewith, a narrow projecting head member extending from a blade support member or from a blade and being arranged circumferentially entirely around the clearance space and substantially closing the space to prevent leakage of fluid therethrough, the size of the bead member relative to adjacent portions of the blade and support member being sufficiently small that thermal expansion may result in some crushing of the bead member to make it conform exactly at normal operating temperature to the size and shape of the cooperating part without imposing excessive stresses on either blade or support member.

ALAN HOWARD.
CHAPMAN J. WALKER.

REFERENCES CITED

The following references are of record in the file of this patent:

UNITED STATES PATENTS

| Number | Name | Date |
| --- | --- | --- |
| 1,352,277 | Junggren | Sept. 7, 1920 |
| 1,427,179 | Waller | Aug. 29, 1922 |
| 1,928,504 | Schaper | Sept. 26, 1933 |
| 2,013,512 | Birmann | Sept. 3, 1935 |
| 2,225,769 | Conrad | Dec. 24, 1940 |
| 2,401,826 | Halford | June 11, 1946 |
| 2,417,486 | Hagemann | Mar. 18, 1947 |

FOREIGN PATENTS

| Number | Country | Date |
| --- | --- | --- |
| 200,269 | Great Britain | July 12, 1923 |
| 609,682 | Great Britain | Oct. 5, 1948 |
| 346,599 | Germany | Jan. 5, 1922 |
| 781,057 | France | Feb. 18, 1935 |
| 891,422 | France | Dec. 11, 1943 |